United States Patent [19]

Durand

[11] 4,069,877
[45] Jan. 24, 1978

[54] MECHANISM FOR TENSIONING FLUID HOSES ON A ROCK DRILL FEED

[75] Inventor: Charles A. Durand, Aurora, Colo.

[73] Assignee: Gardner-Denver Company, Dallas, Tex.

[21] Appl. No.: 741,911

[22] Filed: Nov. 9, 1976

[51] Int. Cl.² .......................................... B23Q 5/027
[52] U.S. Cl. .................................. 173/152; 173/160
[58] Field of Search ............................. 173/152, 160; 137/355 R, 355.17, 355.2, 355.26; 254/172, 198

[56] References Cited

U.S. PATENT DOCUMENTS

| 3,500,941 | 3/1970 | Rudman | 173/160 |
| 3,508,619 | 4/1970 | Huffman | 173/160 |
| 3,721,293 | 3/1973 | Ahlstone et al. | 254/172 |
| 3,807,510 | 4/1974 | Boom et al. | 173/160 |

Primary Examiner—Robert A. Hafer
Attorney, Agent, or Firm—Michael E. Martin

[57] ABSTRACT

A tensioning mechanism for the fluid conductor hoses of a feed mounted rock drill comprises a plurality of fluid cylinders mounted stationary on a bracket supported midway along the length of the drill feed channel. Elongated tubular pistons are slidably supported in the cylinders and are connected to the respective hoses. The cylinders may be charged with pressure fluid such as grease or the like to bias the pistons to tension the hoses and prevent damage to the hoses or interference with movement of the drill.

3 Claims, 4 Drawing Figures

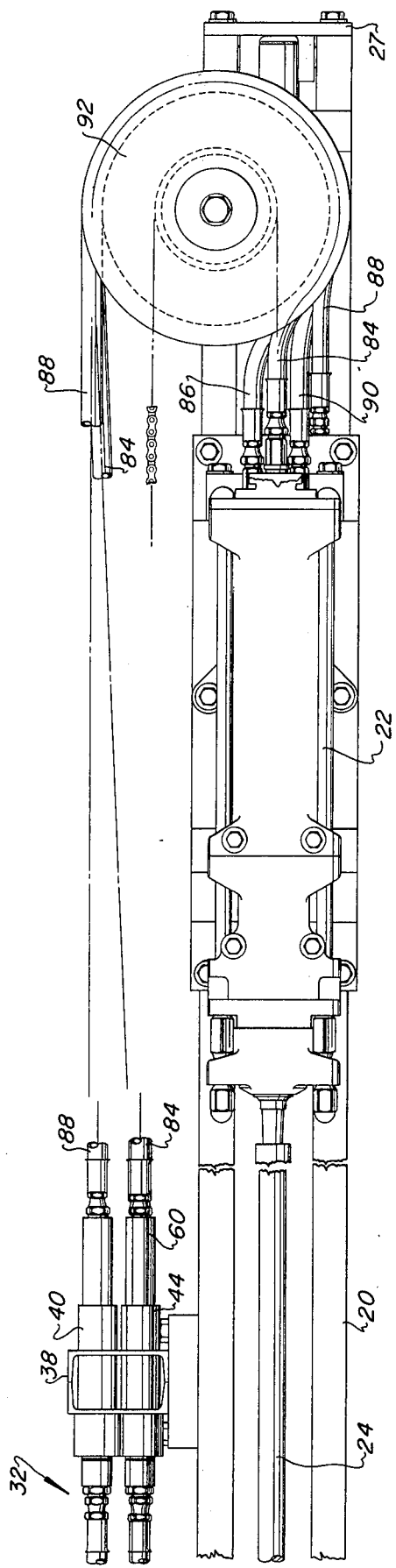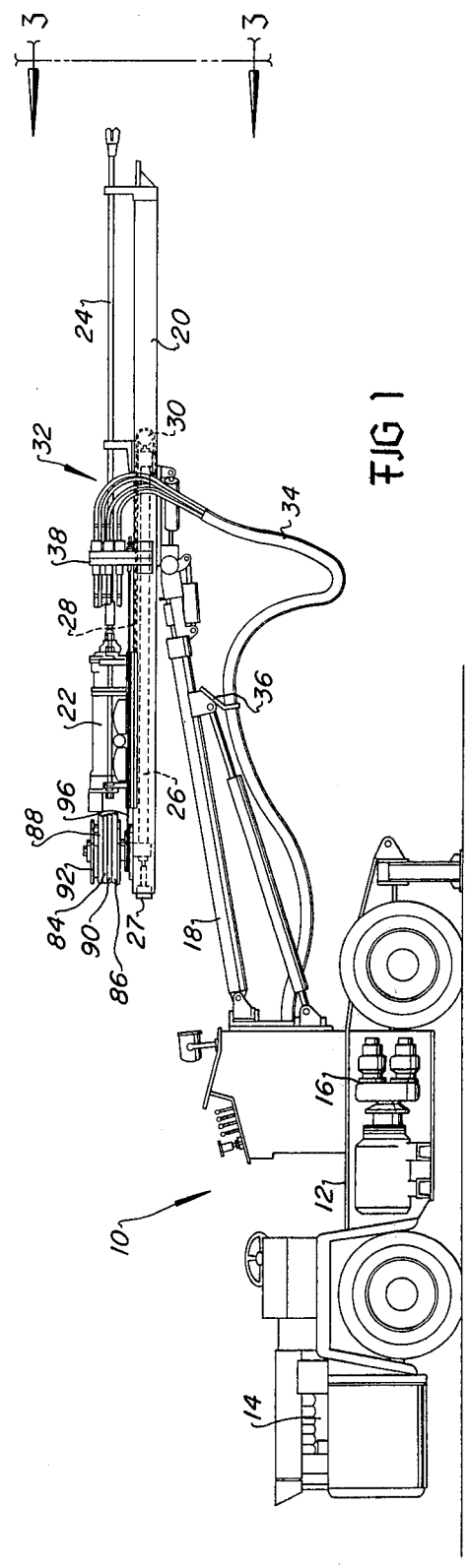

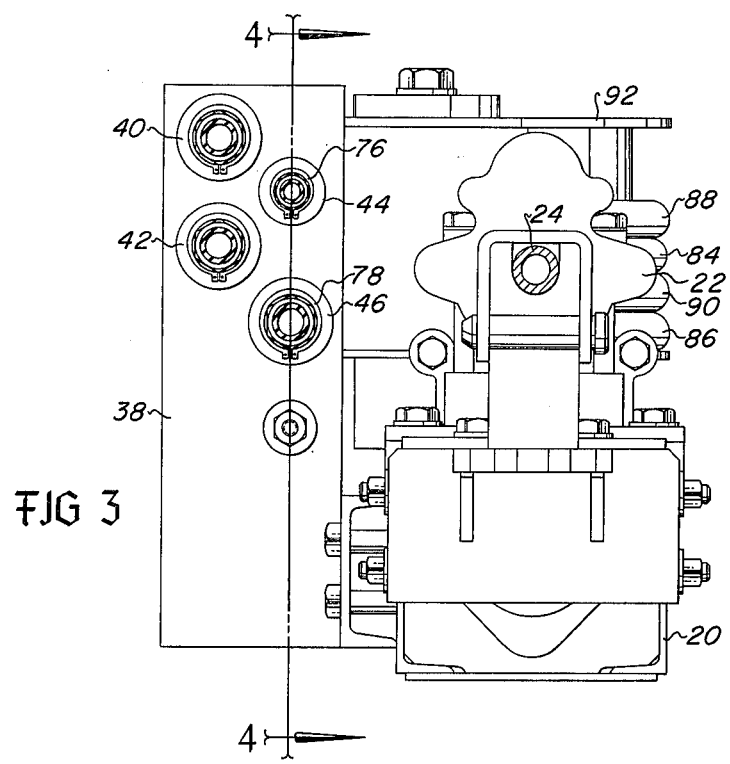

MECHANISM FOR TENSIONING FLUID HOSES ON A ROCK DRILL FEED

BACKGROUND OF THE INVENTION

Portable rock drilling machines are generally characterized by an elongated support or feed channel upon which a fluid actuated drill motor is mounted for linear movement along the support to advance the drill stem into the hole being drilled. Fluid actuated drill motors typically require a plurality of flexible fluid conductor hoses leading to and from the drill motor for conducting working fluid such as hydraulic oil to actuate the drill stem rotation mechanism and the drill percussion mechanism. Hole cleaning fluid is also normally introduced to the drill stem through suitable passages in the drill motor. The stiffness of the high pressure hose required for use with fluid actuated rock drills aggravates the problem of properly training and tensioning the various fluid conductor hoses to prevent their being damaged during use or interfering with the movement of the drill motor along the feed support.

SUMMARY OF THE INVENTION

The present invention provides for an improved arrangement of the flexible fluid conductors for fluid actuated rock drilling machines whereby the conductors may be properly trained along a drill feed channel and selectively tensioned so as to reduce the risk of damage to the conductors and their interference with the movement of the drill motor.

In accordance with the present invention there is provided on a rock drill feed support a conductor guide together with fluid actuated means for selectively tensioning each of the fluid conductors whereby the conductors may be connected to the drill motor and properly trained to prevent sagging or bending which may impede the flow of fluid through the conductors as well as place unwanted stresses thereon.

In accordance with the present invention each flexible fluid conductor is connected to a tubular piston which is slidably disposed in a cylinder mounted on the drill feed support and is biased by pressure fluid introduced into the cylinder to tension the fluid conductor. The tubular pistons are advantageously formed to include passages therein whereby the pistons form part of the conduit means for conducting fluid to and from the drill motor.

The above noted features and advantages of the present invention will be appreciated from consideration of the following detailed description and the drawings.

BRIEF DESCRIPTION OF THE DRAWINGS

FIG. 1 is a side elevation view of a portable rock drilling apparatus including the fluid conductor tensioning mechanism of the present invention;

FIG. 2 is a plan view of the rear portion of the drill feed support of the apparatus of FIG. 1;

FIG. 3 is an end elevation view of the feed support taken generally from the line 3—3 of FIG. 1; and, FIG. 4 is a section view taken along the line 4—4 of FIG. 3.

DESCRIPTION OF THE PREFERRED EMBODIMENT

Referring to FIG. 1 of the drawings a portable rock drill apparatus is illustrated and generally designated by the numeral 10. The apparatus 10 includes an undercarriage 12 upon which is mounted a suitable prime mover 14 for propelling the apparatus, and pump means 16 for generating pressure fluid, respectively. The apparatus 10 includes an elongated boom 18 mounted thereon for movement to position an elongated feed support 20 disposed for pivotal movement on the distal end of the boom. The boom 18 and feed support 20 are generally of a type well known in the art of rock drilling apparatus.

The feed support 20 is adapted to support a fluid actuated rock drill motor 22 for linear sliding movement to and fro along the support. The drill motor 22 is adapted to actuate a drill stem and bit 24 for drilling rock or the like. The feed support 20 includes suitable mechanism such as an elongated fluid cylinder 26 for feeding the drill motor 22 along the support. The cylinder 26 is disposed in such a way that the cylinder piston rod is fixed to the rearward end 27 of the support 20. The drill motor 22 is pulled forwardly along the support 20 by a flexible chain 28 or the like which is connected to the drill motor at one end, is trained over a wheel 30 on the end of the cylinder 26, and is fixed at the opposite end to the support.

The drill motor 22 is supplied with pressure fluid such as high pressure hydraulic oil by way of a plurality of flexible fluid conductors generally designated by numeral 32 which are connected to suitable control circuitry, not shown, on the undercarriage 12. The conductors 32 are disposed within a flexible boot 34 and are loosely supported by a bracket 36 to allow for movement of the boom and feed support 20 with respect to the undercarriage 12. Referring also to FIGS. 2, 3, and 4 the feed support 20 includes an upstanding bracket 38 disposed approximately midway along the longitudinal length of the feed support and detachably fastened thereto. The bracket 38 comprises support means for a plurality of elongated cylindrical members 40, 42, 44, and 46 which are fitted in respective bores in the bracket. Referring to FIG. 4 in particular, the members 44 and 46 are shown in longitudinal section and are respectively formed to have transverse shoulders 48 and 50 for locating the members with respect to the bracket 38. The members 44 and 46 comprise pressure fluid cylinders and are respectively formed to have longitudinal bores 52 and 54 in which are slidably disposed respective elongated tubular pistons 56 and 58. The pistons 56 and 58 are formed with reduced diameter portions 60 and 62. Accordingly, the cylinders 44 and 46 each have respective expansible chambers formed therein. The cylinder 44 is provided to be substantially fluid tight by annular seals 64 and 66. Similar seals are provided for the cylinder 46. The pistons 56 and 58 are formed to have longitudinal passages 68 and 70 which open to both ends of the pistons. The pistons 56 and 58 are also provided with a series of longitudinally spaced apart annular grooves 72 and 74 which are adapted to receive suitable retaining rings 76 and 78 to limit the movement of the pistons in their respective cylinders. The cylinders 44 and 46 are provided with suitable fittings 80 for introducing pressure fluid such as grease into the bores 52 and 54. The cylinders 44 and 46 are also provided with suitable manually actuated cocks 82 for releasing fluid from the cylinder bores.

The pistons 56 and 58 are further provided with suitable threaded portions at their opposite ends for being connected to the fluid conductors 32 and to respective conductors 84 and 86. The fluid conductors 84 and 86 are similar to the conductors 32 and comprise flexible hoses made of reinforced synthetic rubber or similar resilient materials. The ends of the conductors 84 and 86 are provided with threaded fittings which may be of any of a number of well known types. Referring again to FIGS. 1 and 2 also, the conductors 84 and 86 along with similar conductors 88 and 90 are trained around a rotatable guide 92 and are suitably connected to the drill motor 22. The conductors 84, 86, 88 and 90 may comprise means for conducting pressure fluid to the drill motor 22 for operating suitable percussion and drill stem rotation mechanisms, for returning spent fluid to a suitable reservoir, not shown, and for conducting hole cleaning fluid to the drill stem.

The guide 92 is adapted, in the arrangement of the apparatus 10, to traverse the feed support 20 at one half the rate of travel of the drill motor itself. To this end the guide 92 is suitably connected to the cylinder 26 while the drill motor 22 is connected to the chain 28 for forward feeding movement along the support 20. The drill motor 22 is also connected to a chain 96 which is trained around the guide 92 and suitably connected to the bracket 38 whereby the drill motor may be pulled backward along the feed support at twice the rate of travel of the guide 92. The feed mechanism for the drill motor 22 and guide 92 is merely exemplary. Other arrangements of feed mechanisms for drill motors and associated hose guides which will operate in conjunction with the present invention are disclosed in U.S. Pat. Nos. 3,500,941 and 3,508,619 assigned to the assignee of this invention.

Even though the guide 92 is adapted to traverse the feed support 20 at one half the rate of the drill motor 22 to maintain a proper feed rate of the conductors 84, 86, 88, and 90, the stiffness of most high pressure fluid hosing and the length tolerances thereof preclude suitable tensioning of the conductors with fixed connections at the bracket 38 or merely clamping the conductors at the bracket. However, with the present invention the conductors 84, 86, 88 and 90 may be connected to their respective tubular pistons, trained around the guide, and connected to the drill motor and then individually tensioned to a desired degree to prevent sagging, bending, or interfering with movement of the drill motor.

By way of example, after the conductor 84 is connected to the drill motor 22 and to the piston 56, FIG. 4, the cylinder 44 is pressurized by introducing pressure fluid such as a general purpose machine grease or the like through the fitting 80 with the cock 82 in the closed position. The piston 56 will accordingly be urged to move to the right, viewing FIG. 4, until a suitable tension in the conductor 84 is achieved. The retaining ring 76 is then inserted in one of grooves 72 nearest to the end face 45 of the cylinder 44 to prevent any substantial movement of the piston to relax tension in the conductor. If it is desired to release the tension on the conductor 84 the retaining ring 76 is removed from the piston 56 and the cock 82 is opened to release the pressure fluid in the cylinder.

In accordance with the present invention each of the conductors 84, 86, 88 or 90 may be easily removed and replaced without disturbing the tension in the remaining conductors. Variations in the length of any one of the conductors may be easily accommodated because each tensioning cylinder may be actuated independently. Moreover, the pistons with fluid passages therethrough provide a simple and streamlined arrangement for mounting the conductors on the feed support 20. Although the feed mechanism disclosed in detail herein is adapted for operation with a hydraulic percussion drill it will be apparent that the present invention is easily adaptable for use with other fluid actuated percussion as well as rotary drilling machines for drilling in virtually any directional attitude.

What is claimed is:

1. In a portable drilling apparatus the combination comprising:
    an elongated feed support;
    a fluid actuated drill motor mounted on said feed support for linear traversing movement along said feed support;
    at least one flexible fluid conductor means connected at one end thereof to said drill motor;
    conductor guide means mounted on said feed support and adapted to have said flexible fluid conductor means trained reversely therearound;
    support means on said feed support and supporting fluid cylinder means;
    a piston disposed in said cylinder means and being movable therein, said piston including portions projecting from opposite ends of said cylinder means, said portions being adapted to be connected respectively to said flexible fluid conductor means and further fluid conductor means, and said piston including conduit means therein for conducting pressure fluid from one of said fluid conductor means to the other of said fluid conductor means; and,
    means for introducing pressure fluid into said cylinder means to act on said piston to control the tension in said flexible fluid conductor means between said piston and said drill motor.

2. The invention set forth in claim 1 wherein: said cylinder means includes a pressure relief valve for releasing the pressure fluid charge in said cylinder means and acting on said piston.

3. The invention set forth in claim 2 together with: means engaged with said piston and said cylinder means for limiting the movement of said piston with respect to said cylinder means to relax the tension in said flexible fluid conductor means.

* * * * *